Nov. 8, 1966   F. E. KINGSTON   3,284,700
GYROMAGNETIC RESONANCE SPECTROMETER WITH SPIN DECOUPLING
Filed Aug. 17, 1964                                    2 Sheets-Sheet 1

INVENTOR.
FLOYD E. KINGSTON
BY
Wm. J. Nolan
ATTORNEY

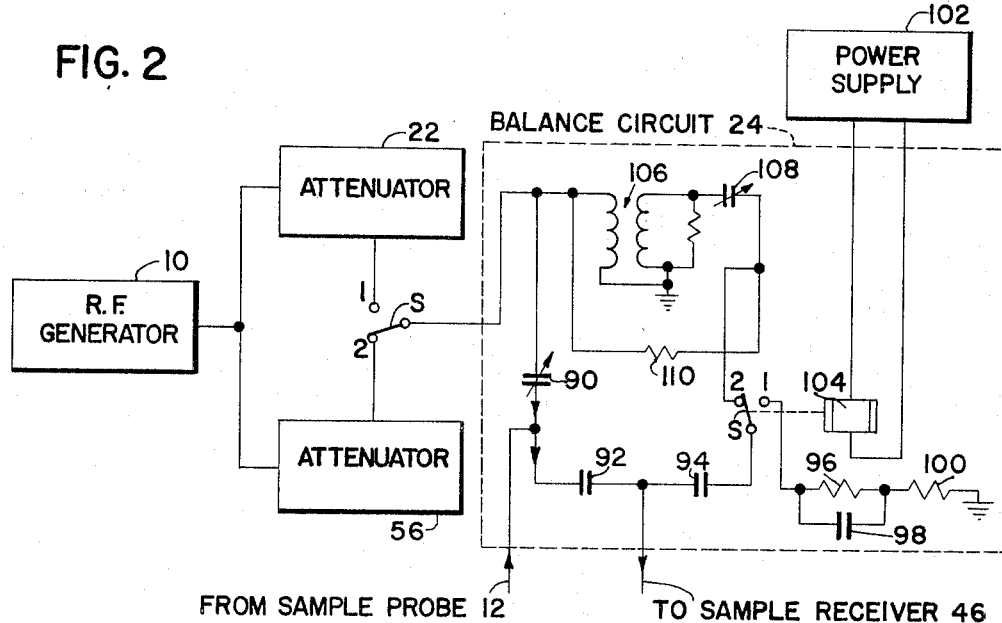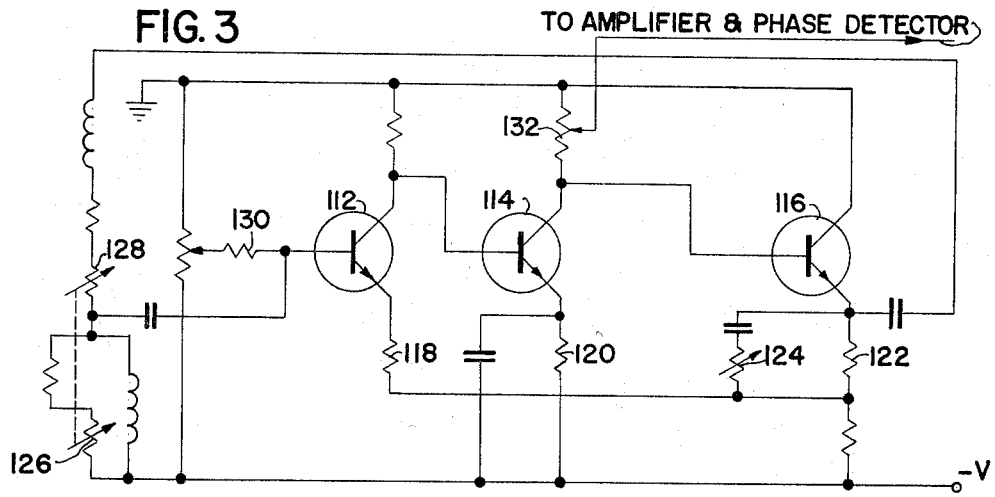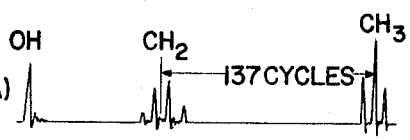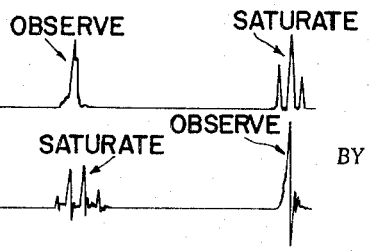

United States Patent Office 3,284,700
Patented Nov. 8, 1966

3,284,700
GYROMAGNETIC RESONANCE SPECTROMETER
WITH SPIN DECOUPLING
Floyd E. Kingston, Palo Alto, Calif., assignor to Varian Associates, Palo Alto, Calif., a corporation of California
Filed Aug. 17, 1964, Ser. No. 390,092
6 Claims. (Cl. 324—.5)

This invention relates to gyromagnetic resonance, and in particular to an improved spin-spin decoupler that may be used with a nuclear magnetic resonance spectrometer.

One type of gyromagnetic resonance spectrometer presently utilized for analyzing an unknown or analysis sample in a measurement channel incorporates a reference or control sample and a nuclear sideband oscillator in an oscillator channel for providing field frequency control. A detailed description of such a spectrometer is set forth in U.S. Patent 3,173,083 issued in the name of W. Anderson et al., and assigned to the same assignee. The nuclear sideband oscillator acts to change the modulation frequency at the control sample and at the unknown sample, and thereby functions to maintain a constant ratio between the polarizing magnetic field surrounding the unknown and control samples and the radio frequency (R.F.) exciting signal supplied to the samples by an R.F. generator. The R.F. exciting signal is locked to the magnet field through the modulating frequency of the nuclear sideband oscillator whereby noise and baseline instability are minimized in the observed spectrum.

When the unknown or analysis sample consists of different groups of coupled atom portions such as spin coupled nuclei, and it is desired to observe the resonance of one of such groups, then spin decoupling apparatus is utilized, such as described in U.S. Patent 3,068,399, assigned to the same assignee. In such apparatus, the effect of spin-spin interaction between different atom portions or nuclei is disturbed by the application of an R.F. field of suitable frequency and intensity. When using such R.F. field to saturate and decouple groups of atom portions, it is necessary to employ a different R.F. field, displaced in frequency from the decoupling R.F. field, to observe the resonance transitions of the analytical sample. However, the frequency of the R.F. field employed for saturating atom portions or nuclei of the analytical sample must follow any variations that occur in the frequency of the observing R.F. field. It is necessary to provide a stabilization means for precisely locking the saturating R.F. signal to the observing R.F. signal so that complete spin decoupling will be achieved.

It is known that for the purpose of spin decoupling, relatively high R.F. power must be applied to the atom portions to be decoupled. However, R.F. energy of high intensity may cause overloading and spurious interaction between the R.F. generator or transmitter and the sample receiver. In such case, it would be necessary to minimize the effect of such interaction to ensure receiving an accurate resonance signal at the receiver input.

Furthermore, in systems which utilize a reference or control sample disposed adjacent but external to the analytical sample, the modulation field that is generally applied to the analytical sample may develop a fringing or residual field which will deleteriously affect the control sample. This fringing field needs to be cancelled or balanced so that the reference is undisturbed.

An object of this invention is to provide an improved gyromagnetic resonance apparatus which incorporates a spin decoupler.

Another object of this invention is to provide a gyromagnetic resonance apparatus wherein frequency stabilization is achieved.

Another object is to provide a gyromagnetic resonance apparatus wherein undesirable interaction between the transmitter and receiver of a spectrometer is effectively optimized.

A further object of the invention is to provide a gyromagnetic resonance apparatus wherein the effect of undesirable fringing magnetic fields between an analytical sample and an external reference sample is virtually eliminated.

According to this invention, a gyromagnetic resonance apparatus, such as a nuclear magnetic resonance (NMR) spectrometer that incorporates a nuclear sideband oscillator, comprises a spin decoupler which includes a variable frequency oscillator and phase detection means for deriving the NMR signal of an analytical sample. A radio frequency generator or transmitter provides a decoupling or saturating signal to such analytical sample; an observing signal to the analytical sample; as well as exciting an external control or reference sample to resonance. The inventive apparatus also incorporates a field frequency control loop that compensates for variations in the polarizing magnetic field encompassing the samples; and a phase lock loop which locks the nuclear sideband oscillator precisely to a fixed, stable modulation frequency.

In addition, the spectrometer of this invention utilizes relatively high power for spin decoupling, and provides an R.F. balance circuit to optimize interaction between the R.F. generator or transmitter and the sample receiver or detector. Furthermore, a cancellation circuit including low impedance amplifiers is utilized to maintain proper modulation at the control sample probe.

The invention will be described in greater detail with reference to the drawing in which:

FIG. 2 is a schematic and block diagram of a balance circuit utilized in the spectrometer of FIG. 1;

FIG. 3 is a schematic circuit diagram of a variable frequency oscillator, such as employed in the apparatus of FIG. 1; and FIGS. 4a–c are illustrations of spectra to aid in the explanation of the invention.

Similar numerals refer to similar elements throughout the drawings.

Figure 1:
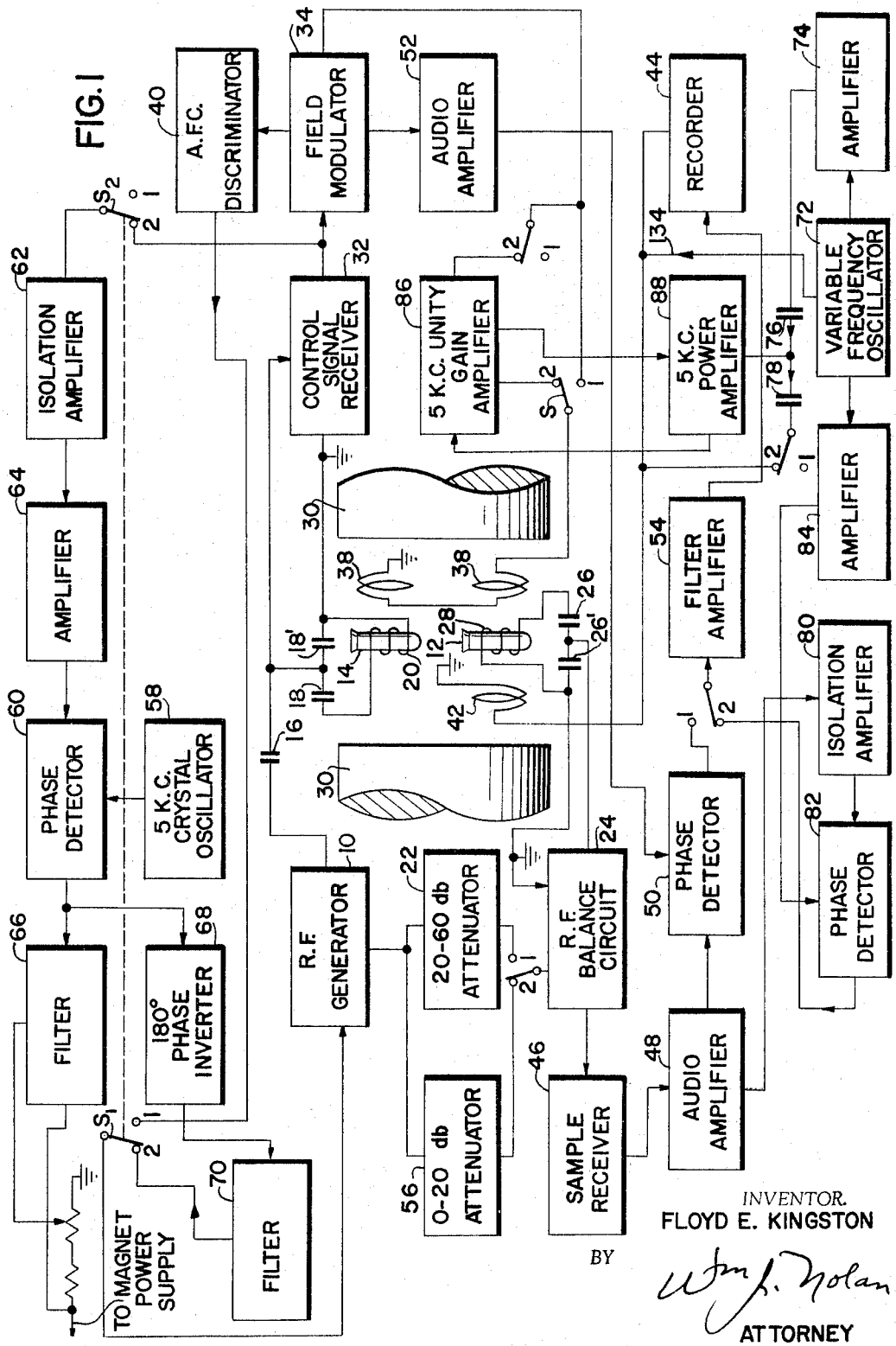
FIG. 1 is a block diagram, partly in schematic, of a gyromagnetic resonance spectrometer, according to the invention.

With reference to FIG. 1, it should be noted that when the multipole switch S is in position 1, the apparatus is substantially similar to the prior art Varian Associates A–60 high resolution spectrometer, which includes a nuclear sideband oscillator loop. For further description, reference is made to an article entitled, "Application of Modulation Techniques to High Resolution Nuclear Magnetic Resonance Spectrometers," by W. Anderson, Review of Scientific Instruments, vol. 33, No. 11, November 1962, pages 1160–1166, as well as to the aforementioned U.S. Patent 3,173,083. In such a nuclear sideband oscillator type spectrometer, a 60 mc. signal at relatively low power, in the order of microwatts for example, is derived from an R.F. generator or transmitter 10 and used for simultaneously exciting a sample 12 to be analyzed in a measurement channel and a control sample 14 located in the sideband oscillator loop or channel. The R.F. energy is applied from the generator 10 through an isolation capacitor 16 and impedance matching capacitors 18 and 18' to an R.F. coil 20 associated with the control sample 14. At the same time, R.F. energy is directed through a 20–60 db attenuator 22 and balance circuit 24 via impedance matching capacitors 26 and 26' to R.F. coil 28 associated with the unknown sample 12. The samples 12 and 14 are positioned in a polarizing field $H_0$ supplied by a magnet 30, which may be a permanent magnet or electromagnet with means for varying the intensity and configuration of the field.

The sideband oscillator loop which serves to provide an audio or low frequency modulating signal to the analytical sample 12 comprises the transmitter or R.F. generator 10 coupled to the R.F. coil 20 to produce a driving R.F. field $H_1$ at an angular frequency $\omega$ (60 mc., for example). The coil 20 is coupled to the receiver and feedback section of the sideband oscillator including a control signal receiver 32, a field modulator 34, which is basically an audio amplifier and limiter, and to modulation coils 38. The modulation coils 38 modulate the polarizing magnetic field $H_0$ at a low or audio frequency $\omega_1$ (for example, 5 kc.) to produce a desired sideband resonance signal (e.g., 60 mc.+5 kc.) from the control sample 14. The sideband resonance signal from the control sample 14 and the leakage signal from the generator 10 are amplified, detected, and transmitted in the oscillator feedback loop to produce the said audio or low frequency signal output $\omega_1$. In effect, the sideband oscillator is a self-excited oscillator audio frequency $\omega_1$ of the low frequency feedback signal which varies with and is determined by the strength of the unidirectional magnetic field $H_0$ and the frequency $\omega$. This oscillator loop ensures stability of the ratio between the radio frequency $\omega$ from the generator 10 and the magnetic field strength $H_0$. The circuit will shift its operating sideband frequency to maintain the exact combination of the field strength and effective R.F. transmitter frequency for proton resonance to occur. In this manner, a control of the field-frequency relationship is established.

The spectrometer also incorporates a transmitter control in the form of an automatic frequency control (AFC) circuit 40 that is coupled from the field modulator 34. When the switch S is in position 1, the AFC circuit 40 produces a D.C. control voltage having an amplitude proportional to the variation in the frequency $\omega_1$ from a reference value. This variable amplitude D.C. signal controls a variable reactance (not shown) in the transmitter 10 to vary the frequency $\omega$ in a manner that compensates for drift of the field $H_0$ or change in the frequency $\omega$. The AFC circuit, in effect, provides a coarse control over the field-frequency relationship.

A D.C. sweep coil 42 is located closely adjacent to the analytical sample 12 and is driven by a D.C. voltage from a potentiometer (not shown) of a recorder 44, which has a carriage that moves in synchronism with the D.C. sweep signal. The D.C. sweep gradually changes the magnetic field around the analytical sample 12 when the recorder is in operation. As the D.C. sweep current passes through a resonant point, i.e., an NMR spectral line, a 60.005 mc. amplitude modulated signal is derived in the measurement channel through the impedance matching capacitors 26 and 26', and passed through the R.F. balance circuit 24 to a sample receiver 46. The 60 mc. radio frequency signal is amplitude modulated with 5 kc. sidebands which are proportional to the strength of the spectrum signal. This NMR signal is detected and amplified by the sample receiver 46 and a 5 kc. signal is detected and passed through an audio amplifier 48 to the phase detector 50. At the same time, the 5 kc. signal is derived from the modulator 34 through an audio amplifier 52 and is applied to the phase detector 50 for a reference. A D.C. signal is produced by the phase detector 50 and channeled through a filter amplifier 54 to the recorder 44, which provides a spectral line determined by the relative amplitude of the spectrum signal seen by the sample receiver 46.

In accordance with this invention, when the multipoled switch S is set at position 2, the spectrometer is modified to include a spin decoupler comprising a variable frequency modulation circuit, a phase lock loop, an R.F. balance circuit, and a cancellation circuit coupled to the A.C. modulation coils.

The technique of spin decoupling is described and claimed in U.S. Patent 3,068,399. Briefly, this technique involves the application of a strong second radio frequency field which can be referred to as $H_2$ to a secondary group of atom portions or nuclei which are spin-spin coupled to the first or primary group of atom portions or nuclei which one desires to observe in resonance. A lower R.F. field $H_1$ is applied to the first or primary group of nuclei to obtain resonance thereof while simultaneously the higher power $H_2$ field is applied to the secondary nuclei to saturate them so that the spin-spin interaction of the secondary nuclei with the first or primary nuclei is disrupted or destroyed.

In the present system when utilizing the spin decoupler feature, the exciting signal from the R.F. generator 10 passes through a 0–20 db attenuator 56 and through the R.F. balance circuit 24 to the sample coil 28. Since the attenuator 56 allows a substantial increase in R.F. energy to pass to the sample 12, it is necessary to optimize interaction between the transmitter 10 and the sample receiver 46 and for this reason a balance circuit 24 may be employed. The balance circuit is depicted in the schematic diagram of FIG. 2 and will be described in greater detail hereinafter.

In the present invention, when the system is switched from the condition where spin decoupling is not employed to the condition where the spin decoupling feature is operative, the R.F. field which had been applied to the analysis sample as a result of the modulation of the 60 mc. field by the 5 kc. field modulation to obtain the resonance signal to be observed is increased in power so that it no longer serves to provide the observed resonance signal but thereafter serves as the saturating or spin decoupling R.F. field. Since this sideband signal is now used for secondary nuclei irradiation for spin decoupling, another R.F. magnetic field must be provided to produce resonance of the primary atom portions or nuclei to be observed as the output resonance signal from the spectrometer measurement channel. The apparatus for increasing the power of what had been the primary frequency and at the same time supplying another frequency to thereafter act as the applied frequency to the primary nuclei is described below.

With spin decoupling operation, a precise frequency control in the form of a phase lock loop is utilized in lieu of the AFC circuit 40, which is not operative when the switch is in position 2. The phase lock loop includes a 5 kc. crystal oscillator 58 which supplies a reference signal to a phase detector 60. At the same time, the 5 kc. modulation component seen in the sideband oscillator loop and at the output of the control receiver 32 is fed through the switch $S_2$, an isolation amplifier 62 and an amplifier 64 to the phase detector 60. An error voltage is developed and directed through a filter 66 to vary the current supplied to the magnet coils, thereby adjusting the magnetic field $H_0$. The error voltage is also channeled through a 180° phase inverter 68 and filter 70 for application to a variable capacitor (not shown) in the input circuit of the R.F. generator 10 to control the transmitter frequency. In this manner, the audio modulation frequency of the nuclear sideband oscillator is phase locked precisely to the crystal oscillator frequency of 5 kc./sec.

During operation of the inventive apparatus, the amplitude of the 5 kc. modulation field and the 60 mc. transmitter power are increased to produce the desired increased R.F. magnetic field $H_2$ for irradiation of the secondary atom portions or nuclei to be spin decoupled from the first or primary group of atom portions or nuclei. To provide a lower power applied R.F. field to the nuclei to be observed, a new frequency is introduced. In this respect, a variable frequency oscillator 72, which is a stable signal generator, provides a variable frequency such as between 4500–5500 c.p.s., that is used to modulate the magnetic field $H_0$ at the analysis sample at a frequency different from the frequency (i.e., 5 kc.) of the oscillator channel (for example, a frequency of 4.863 kc. or 5.137 kc. as recited below), thereby producing a new or second R.F. sideband resonance from the analytical sample that serves as an observing resonance frequency output. The oscillator 72 may be a Wein bridge oscillator with a linear frequency characteristic. The output from the variable frequency oscillator 72 is applied through an amplifier 74, a capacitor 76 and a D.C. blocking capacitor 78 to the D.C. sweep coil 40.

When the oscillator 72 is operative to provide the second sideband resonance signal utilized as an observing frequency, then the resonance detected by the sample receiver 46 is passed through the amplifier 48 and directed to an isolation amplifier 80, and thence to a phase detector 82. The phase detector 82 also receives the stable frequency signal from the variable frequency oscillator 72 through an amplifier 84, and provides a D.C. voltage that is applied to the recorder 42 through the filter amplifier 54.

It has been found that when modulation is applied to D.C. sweep coil 42, at the sample 12 to accomplish the decoupling effect, then a fringing field results. This affects the control sample 14. In such event, the nuclear sideband oscillator would be adversely affected so that the stability of the oscillator loop is degraded. To solve this problem, a unity gain amplifier 86 is coupled to the output of the modulator 34 and in the sideband oscillator loop to drive the modulation coils 38. Furthermore, a power amplifier 88 coupled to the gain amplifier 86 in a feedback arrangement is utilized to drive the D.C. sweep coil 42. The two amplifiers 86 and 88 are flat, low impedance amplifiers. When the index of modulation at the D.C. coil 40 is increased, the amount of current necessary to maintain proper modulation at the control probe 14 is continuously fed to the power amplifier 88 from the nuclear sideband oscillator loop.

In FIG. 2, the R.F. balance circuit 24 of FIG. 1 is illustrated in schematic form, coupled selectively to the output of the attenuator 22 or attenuator 56. When the spectrometer is operating in switch position 1, an output is derived from the 20–60 db attenuator 22 and the signal is passed through a variable capacitance 90 for application to the sample 12. The resonance signal received from the sample 12 is applied through a capacitance 92 to the sample receiver 46, the junction of capacitance 92 and the receiver 46 being coupled to ground through a capacitive and resistive network including a capacitance 94, a parallel network including a resistance 96 and capacitance 98 in series with a resistance 100. This network presents a predetermined impedance to the input of the sample receiver 46.

When the spectrometer is operating with the spin decoupler, a power supply 102 is energized thereby actuating a relay 104 to set the switch S at position 2. In such mode, the 0–20 db attenuator 56 is coupled to the output of the R.F. generator 10, and to the input of the balance circuit 24 providing high R.F. energy thereto. The R.F. signal appears at a bifilar wound, closely coupled transformer 106, having a secondary winding with one end coupled to a variable capacitance 108. The capacitance 108 is connected through a resistance 110 to one end of the primary winding of the transformer 106, with the other end of the primary winding being coupled in common with one of the secondary winding to a point of reference potential, such as ground. The R.F. energy which has been attenuated is passed through the switch S and through capacitance 94 in opposition to the signal detected at the sample 12. In this manner, optimum interaction between the transmitter R.F. and the detected resonance is obtained.

In FIG. 3, there is shown a variable frequency oscillator such as may be used in the circuit of FIG. 1. The variable frequency oscillator comprises a high input impedance amplifier or an NPN transistor 112, and a high gain NPN transistor 114 having its base coupled to the collector output of the transistor 112, the two transistors conducting in opposite phase. A third NPN transistor 116 serves as an emitter follower, and has its base coupled to the collector of the transistor 114. The emitters of the transistors 112, 114, 116 are all coupled through bias resistors 118, 120 and 122, respectively, to a source of negative potential, while the collectors are coupled to ground.

Feedback is provided as an automatic gain control to the base of transistor 112 to vary the gain of the circuit and to maintain a substantially constant amplitude output signal. A thermistor 124 is located in the feedback loop. The frequency output of the oscillator circuit may be adjusted by a pair of ganged variable resistors 126 and 128. A variable resistance 130 is also coupled to the base of the transistor 112 to establish the bias point of the circuit initially. In addition, a potentiometer or variable resistance 132 coupled to the collector of the transistor 114 may be adjusted to control the gain of the circuit. An output signal of substantially constant amplitude and desired frequency is taken from the variable resistance 132, and fed to the amplifier 84 and phase detector 82 as illustrated in FIG. 1.

The above described spectrometer was operated with ethanol ($CH_3$—$CH_2$—$OH$) as the unknown sample, and spectral traces were derived as illustrated in FIGS. 4a–c. With the spectrometer switch in position 1, and without the spin decoupler in operation, the trace for acidified ethanol when modulated at 5 kc./sec., FIG. 4a, indicates the $CH_2$ and $CH_3$ resonance lines located at about 137 cycles apart. In position 2, with the spin decoupler including the variable frequency oscillator 72 in the system, the $CH_3$ line is saturated at a modulation frequency of 5000 c.p.s., for example, and the $CH_2$ line resolved into a sharp resonance line as shown in FIG. 4b, at 4863 c.p.s. With the variable frequency oscillator manually set so that the modulation frequency is 5 kc.+137 c.p.s., or 5137 c.p.s., the $CH_2$ line is saturated and the $CH_3$ line is observed as a single sharp peak, as in FIG. 4c.

Generally, when switching from one modulation frequency to another, such as from 5137 c.p.s. to 4863 c.p.s. to obtain a new trace, the variable frequency oscillator is first set manually, and then the recorder pen is repositioned to a starting point with a separate knob, so that the traces will be substantially in juxtaposition. However, with such change in modulation frequency the resonance lines for each trace will appear at a different position during the D.C. sweep so that the spectral peaks will not be in alignment. To correct this condition, a single control knob is provided to control a potentiometer coupled between the variable frequency oscillator 72 and the D.C. sweep coil 40, as represented by the lead 134 in FIG. 1. By means of such single knob, the voltage to the D.C. sweep coil is varied in accordance with changes in the frequency of the oscillator 72. The control knob and associated potentiometer are so calibrated that the resonance peaks are automatically aligned, as depicted in FIGS. 4a–c.

It should be understood that the particular configuration and parameters set forth above may be changed and modified and thus the scope of the invention is not limited thereto. For example, the frequencies of operation, the levels of attenuation and the modes of modulation may be varied without departing from the spirit of the invention.

What is claimed is:

1. Gyromagnetic resonance apparatus including a measurement channel and an oscillator channel, said measurement channel adapted to contain a first gyromagnetic substance and said oscillator channel adapted to contain a second gyromagnetic substance, means for producing a unidirectional magnetic field for polarizing said substances, means for applying driving radio frequency magnetic fields so said substances at an angle to said polarizing magnetic field to produce gyromagnetic resonance in said substances, means for modulating one of said polarizing or radio frequency magnetic fields applied to each of said two substances at a periodic low frequency rate to produce radio frequency side band resonance signals from the substances, the parameters of the polarizing and radio frequency fields at each substance being so selected that resonance at one of the side band frequencies is produced in each substance, means in said measurement channel for detecting the resonance condition in said first substance, said oscillator channel including circuit means for supplying the low frequency modulation signal to said polarizing or radio frequency magnetic fields, said low frequency modulation producing the side band resonance signals from the substances, said circuit means including means for detecting said side band resonance signal in said second substance to produce an output signal at said low frequency rate for use by said circuit means as said low frequency modulation signal, means for selectively changing the strength of the driving radio frequency magnetic field applied to said first gyromagnetic substance whereby the radio frequency field of increased strength may produce a spin-decoupling effect on particular secondary atom portions in said first substance, and means operative, when the strength of said radio frequency magnetic field is increased, to apply another low frequency modulation to said first gyromagnetic substance to produce a different side band gyromagnetic resonance signal from primary atom portions in said first substance, said side band resonance signal from the primary atom portions being detected in said detecting means in the measurement channel.

2. Gyromagnetic resonance apparatus as claimed in claim 1 including means for sweeping one of said radio frequency or polarizing magnetic fields at one of said substances to thereby sweep through the side band resonance from the primary atom portions in said measurement channel substance.

3. Gyromagnetic resonance apparatus as claimed in claim 1 wherein said means for modulating one of said fields at each substance comprises means for modulating said polarizing magnetic field at said low frequency rate.

4. Gyromagnetic resonance apparatus as claimed in claim 1 wherein said means for selectively changing the strength of the driving radio frequency magnetic field includes radio frequency attenuator means and said means for applying said other low frequency modulation to said first gyromagnetic substance includes a variable frequency oscillator.

5. Gyromagnetic resonance apparatus as claimed in claim 4 including means for sweeping one of said radio frequency or polarizing magnetic fields at one of said substances to thereby sweep through the side band resonance from the primary atom portions in said measurement channel substance.

6. Gyromagnetic resonance apparatus as claimed in claim 4 wherein said means for applying said low frequency modulation includes at least one modulation coil coupled to said variable frequency oscillator and positioned in said polarizing magnetic field.

References Cited by the Examiner
UNITED STATES PATENTS 3,127,556  3/1964  Gielow et al. _____ 324—0.5

OTHER REFERENCES

Baker et al.: Review of Scientific Instruments, vol. 34, No. 3, March 1963, pp. 238–246 incl.

Ernst et al.: Discussions of the Faraday Society, No. 34, 1962, pp. 43 and 46–51 referred to.

Freeman et al.: Proceedings of the Physical Society of London, vol. 79, April 1962, pp. 794, 795, 798–802, and 807 relied on.

WALTER L. CARLSON, *Primary Examiner.*

MAYNARD R. WILBUR, *Examiner.*

A. E. RICHMOND, *Assistant Examiner.*